Aug. 25, 1942. C. G. HAWLEY 2,294,179
METHOD FOR SCREENING BURDENED FLUIDS
Filed Oct. 18, 1938 3 Sheets-Sheet 1

INVENTOR.
CHARLES G. HAWLEY
BY
ATTORNEYS

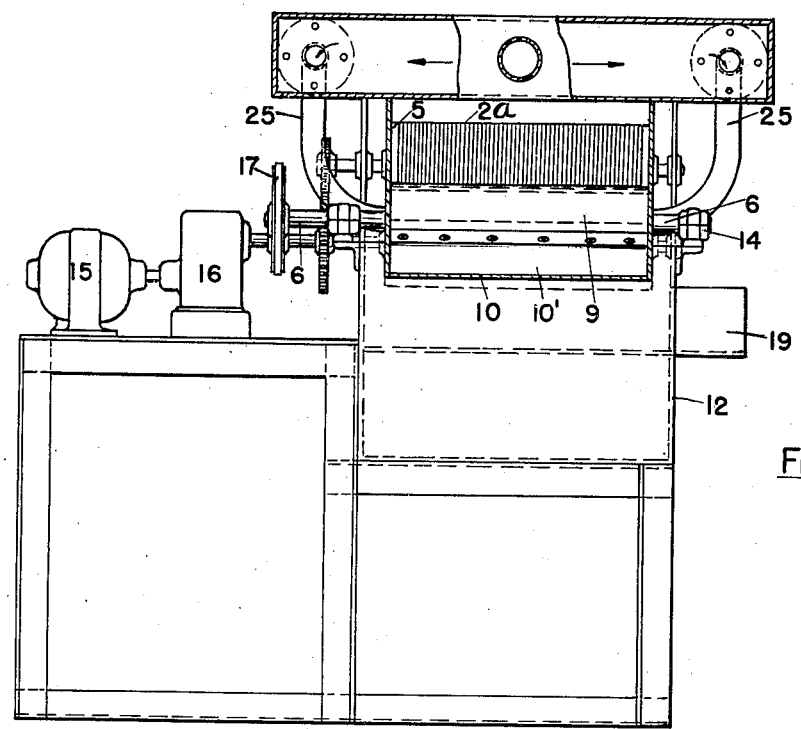
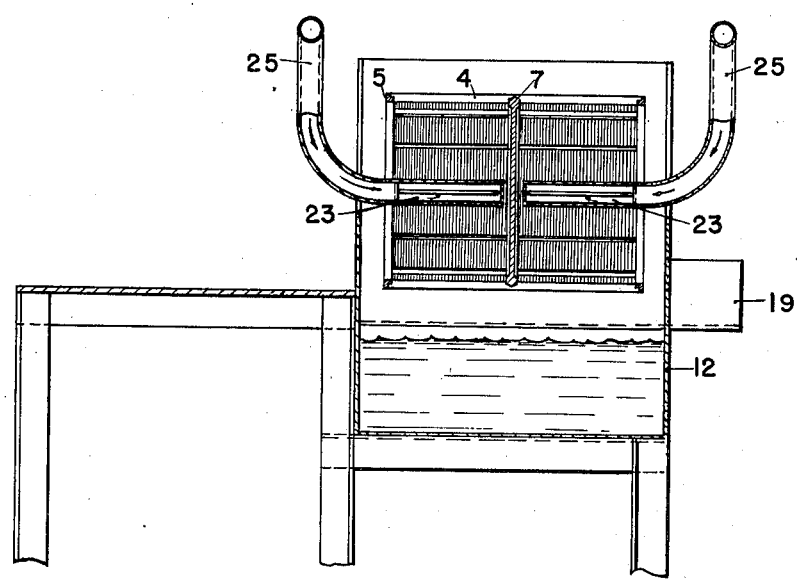
Fig. 4.
Fig. 5.

Patented Aug. 25, 1942

2,294,179

UNITED STATES PATENT OFFICE 2,294,179

METHOD FOR SCREENING BURDENED FLUIDS

Charles Gilbert Hawley, Cleveland, Ohio; Hope Hawley Degenhardt and Virginia Taylor Hawley, executrices of Charles Gilbert Hawley, deceased, assignors, by mesne assignments, to Hawley Engineering Corporation, Cleveland, Ohio, a corporation of Ohio Application October 18, 1938, Serial No. 235,627

2 Claims. (Cl. 210—199)

This invention relates to a method for screening a burdened fluid and apparatus for the carrying out of the method.

The method in accordance with this invention from the broad standpoint involves passing a burdened fluid inwardly through the upper part of a hollow, substantially cylindrical screen and out through the lower part of the screen while slowly rotating the screen on its horizontal axis, and removing screenings from the face of the screen at a point removed from the path of the fluid inwardly of the screen.

More particularly, according to the method of this invention the screenings will be removed from the back of the screen and they may be removed variously by means of a blast of air directed upwardly from the interior of the screen, by means of a scraper, a brush, a roller, or other suitable means. Variously the screenings will be subjected to drainage on the upper part of the screen before their removal from the back of the screen and following their removal they may be subjected to a squeezing action to expel excess liquid in preparation for their disposition or utilization.

The method in accordance with this invention will be adapted for the screening of various burdened fluids, as, for example, air, gases and liquids carrying solid matter in suspension. However, the method in accordance with this invention will be found especially adaptable for the screening of sewage. In general, the method will be found to be highly efficient inasmuch as the screening effect upon the fluid flowing inwardly of the screen will be effected by the provision of a suitable screen while, at the same time, the screen will be kept clean and prevented from clogging by the outwardly flowing fluid, which will act to clean the screen after the removal of screenings from the face thereof.

The apparatus in accordance with this invention, particularly adapted for the carrying out of the method hereof, though not essential to the practice of the method, will be found to be efficient in operation and simple and economical in construction.

The apparatus in accordance with this invention will comprise essentially a hollow, substantially cylindrical screen mounted for rotation on its horizontal axis in relation to a channel so as to receive liquid therefrom through its upper part and to a fluid receiver positioned to receive liquid passing out through the lower part of the stream, in combination with means for removing screenings from the face of the screen at a point removed from the path of fluid inwardly of the screen or, more particularly, from the back of the screen.

Additionally, and where the apparatus is to be used in connection with the screening of sewage, the apparatus may include means for squeezing the screenings as they are removed from the screen in order to accept screenings therefrom in preparation for their disposition, as by combustion.

It is believed that from the following description of the structure of apparatus and the detail of the carrying out of the method according to this invention, this invention will be apparent.

By way of example a screen adaptable for use in carrying out the present invention is of a skeleton formation. The screen surface is formed by many wraps or turns of wire, spirally wound or wrapped upon a generally cylindrical skeleton-like frame. That frame is mounted for rotation.

The wrappings or turns of wire are slightly separated and thus form a circumferentially slotted screen surface. As will be apparent, the spacing of the turns determines the throughcapacity of the screen and it is an easy matter to make these screens with spaces as narrow as one thousandth of an inch, where extremely fine screening is required; and of any greater width that may be fixed upon.

For example, the screen when intended for example for the rough screening of sewage, may be formed of ¼" wire and with ¼" spaces; whereas the screen for a final screening of sewage is formed by wrappings of much finer wire, more closely spaced.

By preference, the wire used in making these screens is of circular cross section, whatever its size. But as will be shown, wires of other cross sections may be used. However, it is generally to be observed that round wire, as compared with other shapes, presents a minimum of surface to which sticky coatings could adhere. It is for this reason that round wire is preferred but flat wire set on edge may be substituted, provided the spacing be not too small and the depth of wire not too great.

Hereunder, means are provided for supporting the rotary screen described within or across a suitable liquid channel; and, for rotating the screen slowly, as required to present successive screen surfaces to the liquid stream; and also as required to lift screenings out of that stream. In addition, the leakage or by-passing of liquid is prevented by simple means here provided; and the structure presented is such that the device is made to function as a two-direction screen, the liquid falling into the screen at the top and pouring outward through the bottom of the screen, which assures cleanliness. Further, means here are provided for the positive removal of screenings from the described moving or rotating screen; and, for the disposition of such screenings, all to the end that the screen shall constantly remain in condition for performance at highest efficiency.

As stated, the wrappings or turns of wire composing the face of the screen may be spaced close together or wide apart, according to the work to be done by the screen. A finely or closely wrapped facing effectively intercepts even extremely fine particles, flakes and fibers and also gelatinous substances and yet is so cleaned that it remains of constant liquid capacity.

All of the matters hereinbefore briefly set forth, and the nature of the invention considered in detail, will be readily understood upon reference to the drawings that form part of the specification, and in which:

Figure 4 is a cross section substantially on the line 4—4 of Figure 3.

Figure 5 is a cross section substantially on the line 5—5 of Figure 3.

Figure 6:
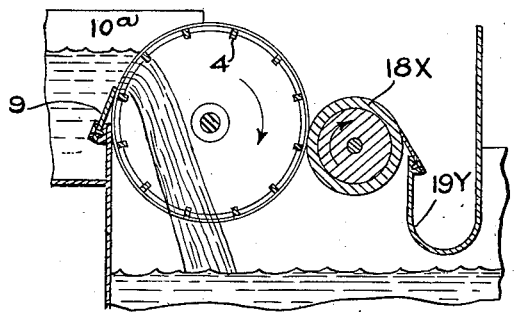
Figures 6 and 7 are views illustrating various arrangements for removing screenings from the screen.

It is convenient to limit the following description to the treatment of liquids but it is to be understood that the method according to this invention is also adapted for employment with aeriform fluids. In some such cases it will be found desirable to wet the screen surface; in others the screen may remain completely dry.

As must be apparent, while a finely spaced screen is used such is adapted to intercept particles, however conveyed to the screen; and, the screen clearing means here depicted are adapted to the removal of the intercepted matters, irrespective of the nature of the fluid which passes through the screen.

The difference between what is called a screen and what is called a filter is chiefly a matter of the fineness of the openings or passages presented. The turns of wire which compose the face of the present screen may be packed close together or may be distinctly separated. A closely packed spiral screen facing may be properly referred to as a filter surface, while spiral wrappings that are distinctly separated will be known as screens; and, screens differing in the width of the open spaces between the wrappings will be gauged or classified according to that width, irrespective of the size of the wire constituting the wrappings.

Referring to the drawings, it will be seen that as before stated, this screen is of skeleton-like formation and of little weight. It may therefore be made of metal of the highest type, adapted to resist wear and corrosion and yet remain low in cost. Being cylindrical and rotary and constantly presenting clean surfaces it need not be of large diameter or length and is therefore of small bulk.

Figure 1:
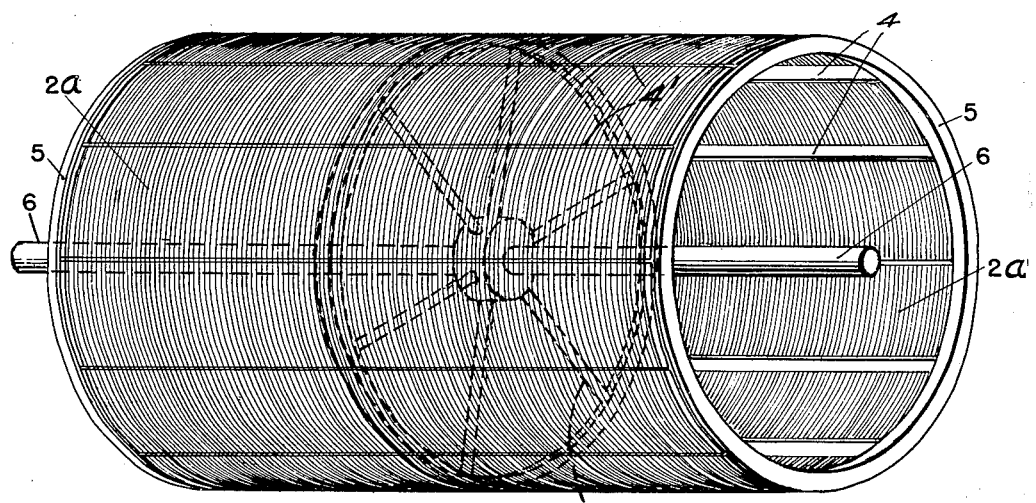
Figure 1 is a perspective view of a screen adaptable for use in carrying out this invention.

By way of example, a screen, as shown in Figure 1, will comprise a skeleton-like formation comprising bars 4 secured at their ends to rings 5. About the frame is wrapped wire 2a. The screen as a whole is mounted on a central shaft 6, supported as by a spider 7 from the bars 4.

By the construction explained, one or both of the ends of the screen may be left open for the accommodation of the blower nozzle or nozzles 23, used for clearing the screen, as hereinafter described.

Conveniently, though not necessarily, the outer edges of the bars 4 are provided with serrations or notches 4' of predetermined spacing, to receive and aid in spacing the wire wrappings. Such serrated bars, when used, are mounted in the opposed rings 5, 5, in manner to present their notches in spiral sequence.

When the described frame has been completed it is mounted for rotation; and while in slow rotation, receives the spiral wrapping of wire.

The invention is not limited to a screen of truly cylindrical form. It may be polygonal in cross section, as will be understood when the screen follower flap 9 is described. (See Figs. 3 and 4.)

Referring to Figs. 2 to 6, it will be seen that the described screen is positioned cross-wise of a flume or influent channel 10. For liquid, this is an open topped trough, the liquid moving in the direction indicated by the arrows in Figs. 2 and 3.

At the end of the flume is a cross piece 10' and attached to that cross piece is the screen following flap 9, before mentioned, preferably composed of flexible material, leather or rubber, though the flap may be made of metal. This follower flap is a peculiarly desirable element, for thereby leakage is prevented. The flap is only gently pressed against the screen by the liquid and it follows and rests against the rotary screen, performing its function reliably whether or not the screen is truly cylindrical. Clearly, the screen may be polygonal and yet serve smoothly.

Figure 2:
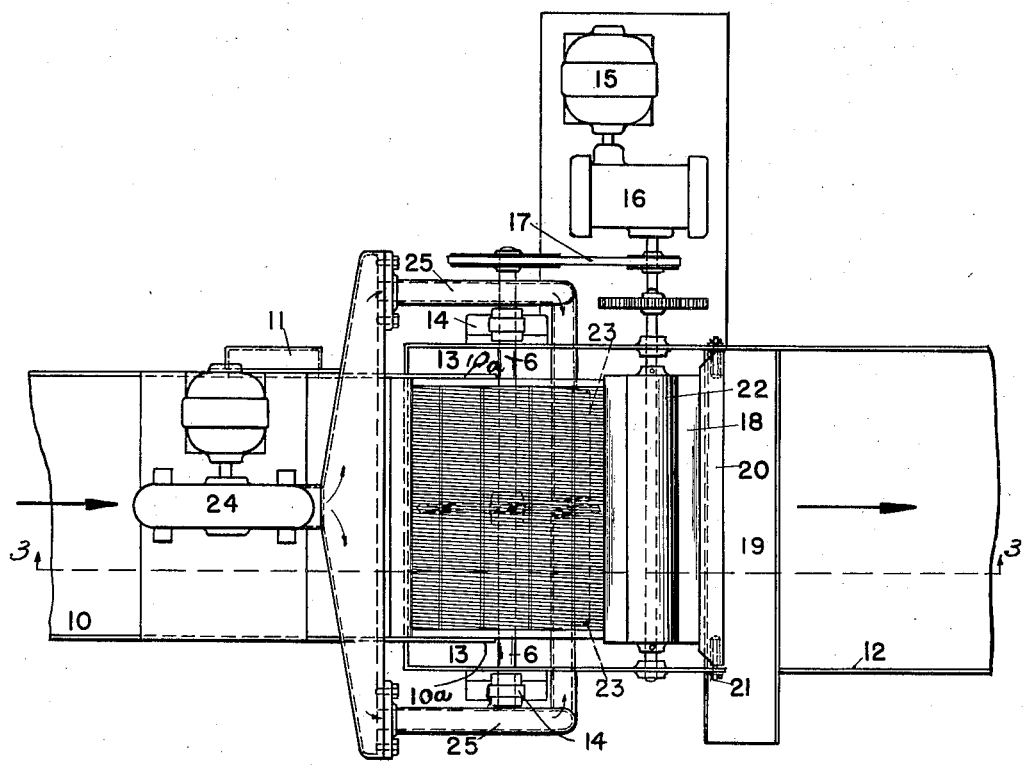
Figure 2 is a plan view of the completed screening apparatus.

As shown in Figs. 2 and 4, the flap 9 extends from side to side of the flume 10. It is next to be noted that extended side portions 10a co-act with the ends 5, 5 of the screen, preventing the flow or fall of liquid around or over the ends of the screen. The side portions 10a are positioned against the sides of the rings 5.

Most conveniently an overflow opening 11 is provided in the side of the flume, preventing undue rise of the level L; and therefore preventing the flooding of the screen. Where the flow of liquid is steady the opening 11 may be dispensed with.

Beneath the screen is a trough or tank 12, which receives the liquid from the screen. By preference, the trough 12 is wider than the trough 10 and rises at the end of the screen to provide the end spaces 13 and supports for the bearings 14 belonging to the screen shaft 6.

The screen shaft and hence the screen derive slow rotative motion in the direction of the arrow (Fig. 3) as from a motor 15, through reduction gearing 16, 17. Even in dealing with sewage, the rotation of the screen need rarely exceed two revolutions per minute, slow movement serving to constantly present adequate surface to the incoming liquid. Obviously, the screen is hollow and the liquid enters the openings of the screen, leaving particles, strings, straws and the like with finer matters upon the outer face of the screen. Next the falling liquid, here afforded aeration, dashes upon and passes through the bottom of the screen, effectively clearing its openings in preparation for succeeding presentation to the liquid in the flume. Because of this action this device is referred to as a two-direction screen. Meantime, through rotation, the matters caught upon the face of the screen are lifted out of the liquid and undergo a natural draining operation upon the exposed top of the screen.

A veritable mat of matters is usually maintained on the face of the screen. Hereunder, those matters are continuously removed from the screen, following the described draining period.

Various devices may be employed for removing the screenings. The best and one which is especially suited to handle sewage screenings is illustrated in Figs. 2 to 5, and will now be described.

The part marked 18 is a roll which parallels the rotary screen, close to or just touching the back face of the screen. By preference the roll 18 is made of metal and its surface is smooth.

The chief thing to note regarding the roll 18 is that it operates in the direction of the arrow (Fig. 3) and at a peripheral speed which is somewhat higher than the peripheral speed of the screen. The gearing for driving the roll 18 is clearly shown in Fig. 2 to be combined with that (15 and 16) belonging to the screen shaft 6.

In consequence of the higher speed of the roll 18 it serves to accept and lift screenings from the face of the slower moving screen. In addition, the roll serves as a conveyor which delivers the screenings to a receptacle or trough 19 which is positioned behind the roll 18. A metal scraper 20 is pivoted at 21 and works smoothly against the side of the metal roll 18 to clear the latter.

The next element to be noted is a roll 22 paralleling the roll 18 and preferably rubber faced. That roll 22 is geared to operate at approximately the same peripheral speed as the roll 18. The connecting gears are shown at 22x in Figs. 2 and 4.

The two rolls 18 and 22 constitute a wringer or squeezer by which excess moisture is expelled from the screenings before they are deposited in the trough 19.

In practice with sewage, the relatively dry screenings thus produced are taken from the trough and are burned in a suitable furnace. Obviously, the screenings may be utilized in various other ways, governed by the character thereof.

It is extremely desirable to positively ensure the cleaning of the screen surface. To that end, and taking advantage of the open ended hollow screen I provide within the latter an air blast nozzle or nozzles 23. That nozzle 23, supplied with air under slight pressure, as by a blower 24 opens against the inner side of the screen somewhat above the roll 18 or trough 19x.

As will be apparent, the drained screenings, ready for expulsion from the screen, are blown outward and thus are positively and safely delivered to the screenings receptacle. The localized blast from the nozzle 23 effectively displaces even fibrous matters which may have lodged between the wrappings of the screen; and therefore, little clearance work remains to be done by the liquid falling outward through the bottom of the screen, as before described.

However, the actual outward washing of the wire wrappings of the screen is always important as a means of cleansing the wire of sticky oils, tars and gums which might otherwise accumulate and stop the openings of the screen.

It is to be noted that the screen shaft is so mounted as to permit its easy removal and as shown the nozzle or nozzles 23 are also removable, so that the screen may be freely lifted from its bearings.

The part marked 27 is a blade which hangs from the nozzle and prevents possible splashing of liquid against the roll 18 or other screenings receptacle.

The structure of Fig. 6 discloses a simple lifting roll 18x and trough 19y which may be used therewith.

Figure 7:
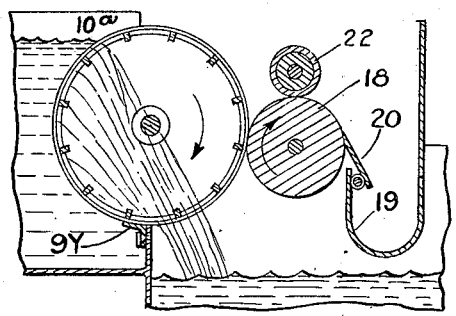
Figure 3:
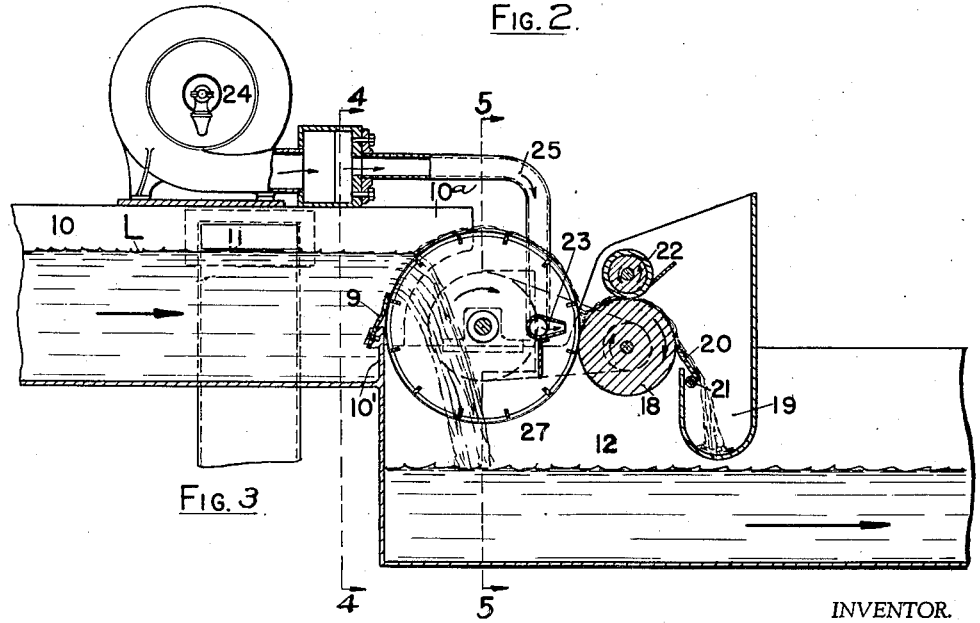
Figure 3 is a vertical longitudinal section on the line 3—3 of Figure 2.

Fig. 7 may be compared with Fig. 3, but is characterized by the still lower position of the follower flap 9y.

As pointed out, the herein described screen may be truly cylindrical, partially polygonal or visibly polygonal, but in every case it will be substantially cylindrical and all such shapes are presumed to be described by the term "substantially cylindrical" as used in the appended claims. Similarly, the difference between the terms "screen" and "filter" have been explained and it has been shown that they are substantially equivalent terms. In the appended claims, the word "screen" will be employed as comprehending either and both.

I claim:

1. The screening method as practiced with a hollow substantially cylindrical screen having a horizontal axis, that consists in passing liquid inward through the upper part of said screen, discharging the liquid outwardly through the lower part of said screen, slowly rotating said screen to elevate screenings above the liquid stream, and exposing the screenings to drainage upon the upper part of the screen, and, lifting the drained screenings from the back of the screen.

2. The screening method as practiced with a hollow substantially cylindrical screen having a horizontal axis, which consists in passing burdened liquid inwardly through the upper part of said screen, leaving screenings upon the face of the screen, slowly rotating the screen and thereby lifting screenings out of the liquid stream and draining them upon the top of the screen, removing drained screenings from the back of the screen and squeezing them to expel excess liquid, in preparation for the utilization of the screenings.

CHARLES GILBERT HAWLEY.